Patented Nov. 6, 1928.

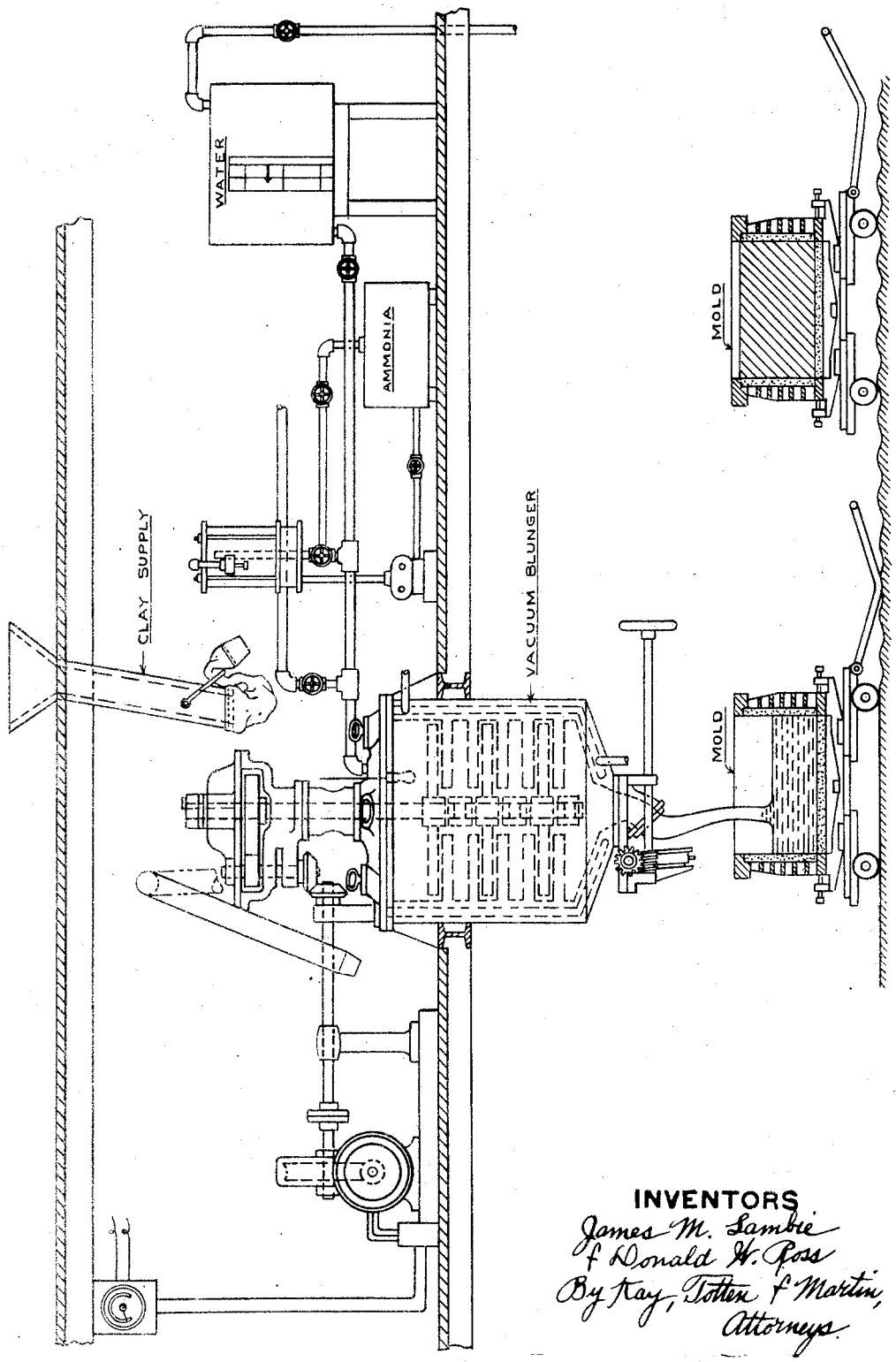

1,690,208

UNITED STATES PATENT OFFICE.

DONALD W. ROSS AND JAMES M. LAMBIE, OF WASHINGTON, PENNSYLVANIA.

METHOD OF MAKING CERAMIC ARTICLES.

Application filed March 31, 1925, Serial No. 19,737. Renewed March 29, 1928.

Our invention relates to a method of and materials for making clay wares and especially tank blocks and similar wares for use against molten glass. The object of the invention is to provide an improved process and altered composition from that usually used for making such tank blocks or other clay wares, whereby a substantially continuous structure in a block more than ordinarily resistant to glass attack is obtained.

The drawing is a diagrammatic representation of one form of apparatus by means of which our method may be practiced.

PRESENT STATUS OF TANK BLOCK INDUSTRY.

(a) *Use of tank blocks.*

In the last few years tank glass manufacturers have made great advances in automatic production, with accompanying great increases in the tonnage of glass drawn from tanks per unit of capacity. This increase in tonnage and in some cases also in quality of glass, requires the maintenance of higher temperatures in the tanks, and entails very much more severe service for tank blocks. The result is that the average length of service of tank blocks is now probably only one-half of what it formerly was. Hence there is a very insistent demand for a tank block that will give increased service at the present advanced temperatures of operation.

(b) *Making of tank blocks.*

At the present time tank blocks are frequently made from a mix consisting of St. Louis (Cheltenham) plastic clay, forty per cent and sixty per cent of other materials, such as Missouri flint (Owensville, Missouri district), or semi-flint (Farber, Missouri district) clays which have been calcined. However, Gross Almerode clay from Germany and other high grade fire clays are sometimes also used to some extent in tank block mixes (bodies). These are high grade refractory materials but do not average up to the most refractory obtainable. Cheltenham and German clays have as one of their characteristics, a relatively high porosity when burned, which is only reduced by very long and high firing, in fact the blocks deform in the kiln before a reasonably low porosity can be reached. A portion of the pot shell from pots that have been in use a long time is very densely burned, and small amounts of it have occasionally been used as grog in tank blocks. This densely burned material usually constitutes but a small percentage of average pot shell. The supply of pot shell, however, is so small that it does not and cannot for any appreciable quantity of ware supply any considerable percentage of the grog required in the manufacture of tank blocks, and hence has not come to be used as a low porosity grog for this purpose.

Tank blocks are at present made by mixing the calcined clay with the plastic clay, adding water to the mixture and pugging until the mass becomes plastic. Made in this way the mass contains considerable quantities of air finely disseminated through it, then by a hand or power rammer this plastic mass is pounded into molds or is molded by being forced from an extrusion machine. Occasionally the blocks are built up entirely by hand. These rammer, extrusion, and hand built blocks invariably contain joints, laminations, or at least regions, between successive lumps in which the lumps are not well bonded together, which weaknesses are at least in part caused by escape of disseminated air into the spaces between the lumps, during ramming, extrusion, or hand working.

These defects in the blocks as formed are a very fruitful source of cracking during drying and firing. If by chance they do not ruin a block during drying and firing, their presence most certainly will depreciate its value in service.

The size of tank blocks made by the above described methods that can be commercially dried by methods at present in use is rather limited. In fact the difficulty of drying such blocks increases very rapidly in proportion as their least dimension is in excess of twelve inches.

Unless the materials from which they are made are very siliceous, and on account of the method of making them, etc., blocks made as above must be fired to extremely high temperatures, or on being put into service, the portions exposed to the full heat of the glass furnace shrink further and fissures open into the interior of the blocks, which greatly aids in their disintegration by glass and glass batch. If in manufacture such blocks are fired at a sufficiently high temperature so that they will not shrink appreciably more in use, during this high firing in the kiln they shrink, warp and soften so as to kiln mark to such an extent that the loss during firing is very great unless the firing is done with extreme care. In addition to and in combination with, the cracking noted above, such blocks disintegrate in use, particularly as follows:

1. By glass getting into the defective regions between lumps in conjuction with its getting into the cracks last above mentioned. By a small amount of solution of the block the glass is then enabled to float large pieces of block away from the main mass.

2. By rapid solution brought about through penetration of glass into the multitude of small holes resulting from the presence of the finely disseminated air in the clay mix.

3. By rapid solution occasioned by the inherent porosity (other than mechanical interstices) of the clays used in the clay mix.

4. The higher temperature of contact of block with glass the more rapid is the solution of the block. Similarly the less refractory the block is the more readily will it be dissolved away.

Reduction in the above mechanical defects of manufacture makes a decided improvement in the wearing qualities of tank blocks. Favorably altering some of the inherent properties of the clay mixes either by use of other clays having different physical properties or by a treatment actually changing the physical properties of a given clay, will further improve the blocks, and favorably altering the chemical composition, will still further improve tank blocks.

FEATURES OF OUR PROCESS.

Our present invention comprises the combined use of the apparatus and the several method steps hereinafter described, together with certain unusual physical and chemical constitutions of tank blocks and tank block raw materials as set forth herein. We overcome the previously mentioned mechanical defects by use of the process known in the ceramic art as "casting".

As the casting of tank blocks has not heretofore been a commercially established process it has been necessary for us to develop not only a new form of apparatus for handling materials, but a new method of procedure and to use particular ingredients, especially clays, required to obtain the desired composition in the finished product. In addition to overcoming the above described defects of present day tank blocks we employ several materials not heretofore commonly used in the manufacture of such blocks.

The method and materials together with the percentages thereof are more or less interdependent. Hence in the following descriptions we consider apparatus by itself and method and materials together. Much of the improvement we have wrought in tank blocks resulted from the overcoming of the difficulties incident to the casting of such thick sections. Thus the description of our method and materials given below is largely a recitation of how certain difficulties of casting have been overcome. This in turn is followed by description of other features that aid us in making better blocks.

The novel features of our invention then consist of:
1. Innovations in the handling of materials.
2. Novel methods of procedure.
3. Materials:
   (a) Unusual.
   (b) In novel proportions.

By our method it is possible to successfully cast blocks of any desired size, substantially free from the mechanical defects of hand made blocks, whereas heretofore it has been deemed necessary to manufacture blocks of the larger sizes by hand or extrusion method, notwithstanding the objections incident to the employment of such methods. Not only are we enabled to successfully manufacture tank blocks and other bulky ceramic wares by the casting method, but a better finished product is obtainable than has heretofore been deemed possible by either casting or extrusion. Blocks manufactured by our method are more dense than those heretofore made, as we have found that a block manufactured by our method will weigh about 130 lbs. per cubic foot as against about 120 lbs. per cubic foot in the case of blocks made by the processes heretofore employed. This increased density is important because of the greater strength secured and less tendency toward deterioration of the block in service.

In practicing our invention we may employ apparatus which consists of a combination of conventional and novel features, by means of which the following steps are carried out:

1. Mixing of clay, water and clay altering substances to form a ceramic paste.
2. Subjecting the paste while in motion, to a vacuum.
3. Controlling the temperature of the paste until it is molded.
4. Means for admitting paste to molds:
   (a) In predetermined amount.
   (b) Entrapping a minimum amount of air.
5. Molding of the paste.

In developing the method we use in making tank blocks and similar bulky ware by means of casting, we have overcome the difficulties:
1. Of molding, by
   (a) Thorough working of the paste.
   (b) Vacuumizing the paste.
   (c) Vibrating the molds.
   (d) Standardized assemblable molds.

2. Of drying, by the use of
   - (a) Grog grains of assorted sizes graded so as to yield substantially maximum compactness—minimum interstitial space.
   - (b) Low percentage of plastic clay.
   - (c) Certain deflocculatable plastic clays.
   - (d) Special defloccuating agents for deflocculating the clay.
   - (e) Molds having porous walls.
   - (f) Paraffin on exposed portion of wet blocks.
3. Of burning, by additional use of
   - (a) Low porosity grog.
   - (b) Substantially non-shrinking fines in the grog.
   - (c) Fines of such nature in the grog that they expand on being fired.

In addition to the factors above mentioned resistance of the finished ware to glass action is also increased by our use of:

1. Dense burning plastic clay.
2. Exceptionally refractory materials (certain ball clays and cyanite).

Description of Our Process.

(A) Apparatus.

To accomplish these steps of handling the materials, we dissolve solid clay altering substances in water, in a suitable container, and store aqua or liquid ammonia in another suitable container, which may be arranged as shown in the accompanying drawing. Supplies are drawn from these containers and mixed with "clay" (suitable body which has been previously mixed dry) to form a ceramic paste. This mixing may be done in a vacuum tight ammonia tight blunger type machine, that is jacketed for control of temperature therein. Or it may take place before the materials enter the blunger type machine (hereinafter referred to as "vacuum chamber" or merely as "chamber"). This ceramic paste is subjected to a partial vacuum while it is in motion. The vacuum chamber is fitted for this purpose, as well as being equipped with proper openings and other necessities such as a window, and a light within the chamber, so that the condition of materials within may be viewed as desired. An exit from the bottom of the chamber, for purposes of emptying is fitted with a closure device such that predetermined portions of our paste (which paste contains rather coarse particles) can be allowed to flow out as may be desired. Apparatus suitable for performing these operations is described in detail in our copending application, Serial No. 757,422, filed December 22, 1924.

With respect to the form of molds employed, the large cast pieces, such as tank blocks, many of which weigh from 500 to 2500 pounds, are very difficult to handle and slow to dry. The kind of molds heretofore used for such purposes are so costly, cumbersome and otherwise unsatisfactory, that their use alone has been sufficient to prevent the casting of average size tank blocks from becoming a commercial process.

To overcome these difficulties we use standardized assemblable molds having porous walls, which molds are supported on legs so that they can be moved about from place to place. As soon as the slip has consolidated enough in the mold so that it will stand alone the sides of the mold are removed, so that the ware can dry more readily. In addition to the above, such molds have the advantage that the respective parts of the various molds are interchangeable. Thus as soon as a set of sides are removed from one block they can be placed on another base and be ready to fill again. Or as portions of molds become impaired, undamaged parts of several molds may be used in a reassemblage. This cuts the mold cost per block to the place where such molds can compete commercially, in that a heavy investment in molds is not required for a reasonably large output.

Vibrating a mold and its contents soon after the mold has been filled aids in the escape of entrapped air from the paste, and in forcing the paste to the corners of the mold. This step may be performed by drawing a truck carrying a newly filled mold over a floor that is roughened or corrugated as shown in the drawing.

The means by which the foregoing steps of working and vacuumizing the slip, vibrating the mold and the manner of forming and assembling the molds may be of somewhat conventional form, but particular means for performing certain of these steps are described in our copending application, Serial No. 757,422, while the form which standardized assemblable molds may take is shown and described in our copending application, Serial No. 1,593, filed January 10, 1925 (now Patent No. 1,625,947).

(B) Method and materials.

1. *Molding.*—On making the casting paste of the various ingredients and water and pouring into molds as last above described, the paste will be substantially free from the mechanical defects commonly present in hand made blocks. If the slip is thoroughly mixed so that during the mixing a large percentage of the paste is exposed at the surface of the mass, and is thereafter vacuumized, and if soon after, the vacuumized paste has been poured into the molds in which it is formed into ware, these molds be vibrated, the resulting ware is substantially free from small air bubbles which are ordinarily present to a limited extent in cast wares of large dimensions.

2. *Drying.*—Heretofore it has been impracticable to cast such thick sections as tank blocks on account of excessive shrinkage and cracking during drying, and the further shrinking and cracking during firing. It is only by the combination of several means that we are able to overcome these drying difficulties. First, we partially overcome these difficulties by using grog grains of assorted sizes so as to yield substantially minimum interstitial space. Such graded grog requires a minimum of plastic clay to bond it together, and the fines of the grog mixed through the plastic clay prevents the formation of hair cracks in the plastic clay and around the larger grog grains during drying. This lack of hair cracks in bodies, together with minute air blebs or fissures between particles of plastic clay or grog grains, we herein term "continuousness" or "continuity".

We have found that grog, which consists of the proper proportions of the various sized particles, graded down from the maximum size that we use, which is approximately one-fourth inch diameter, so that the smaller particles fit in the spaces between the larger ones to such an extent that the whole can be arranged so as to yield substantially minimum interstitial space ("maximum density"), is the most satisfactory for our use, and requires but little suitable raw clay to properly bond it together.

We find that in combinations of our grogs which yield approximately maximum density and in which the maximum sized particle will just pass through a standard 10-mesh sieve, substantially 33% of the grog will pass through a 100-mesh sieve and that this fine material is graded from minus 100 mesh to extreme fine grained material.

Of course there is quite a range in graduation of grain size that will yield approximately minimum interstitial space. A sample screen analysis of graded grog that approximates the above conditions follows:

|  |  |  |  | Per cent. |
|---|---|---|---|---|
| On | 20 | mesh | screen | =26.62 |
|  | 35 | " | " | =18.62 |
|  | 65 | " | " | =14.45 |
|  | 100 | " | " | = 7.34 |
|  | 150 | " | " | = 5.35 |
|  | 200 | " | " | = 3.28 |
|  | 240 | " | " | = 2.81 |
|  | 330 | " | " | = 5.65 |
| Through | 330 | " | " | =15.88 |

We have determined what this optimum percentage of clay required to properly bond the grog is, and then use substantially that percentage in the mix, thus keeping the drying shrinkage due to plastic clay at at minimum. We have found that by grading the grog as stated, the grog may comprise more than 75% of the mixture and the clay required to properly bond the grog may be less than 25%.

We preferably employ deflocculatable clays as the bond in our casting mix. Certain clays of the ball clay type such as are found in western Kentucky and Tennessee, southern Illinois, southern Missouri and elsewhere respond especially satisfactorily to the action of the deflocculating and similar clay altering substances that we use in our casting process. These particular ball clays are the ones we employ.

With respect to the deflocculating agents which we employ, we prefer combination of ammonia and certain organic substances with the alkaline materials ordinarily used in casting slips, such as claimed in our copending application, Serial No. 744,059, filed October 16, 1924, in conjunction with the special plastic clays last above referred to. Some of these deflocculating agents are as follows.

We commonly employ sodium hydroxide or similar metal alkaline material in the usual small percentages in which they are used in casting slips, and in addition we use either ammonium hydroxide (aqua ammonia) or liquid ammonia, together with one or more organic substances such as oxalic acid, rochelle salt, formaldehyde and citric acid, etc., also in small percentages. Combinations of ammonia and certain organic substances, with the alkaline materials ordinarily used in casting slips, as last above described, used in conjunction with the above mentioned special plastic clays greatly increase the dry weight per unit volume of these clays and similarly decrease the amount of water necessary to make our ceramic paste sufficiently fluid so that it will flow properly into the molds. The presence of calcium (lime) in the water or other materials employed by us tends to interfere with the casting process in that it thickens the slip and renders the salts ineffective. We use special reagents for nullifying these effects exerted by lime on deflocculation of clays, as, for example, an oxalate. We precipitate such calcium by introducing an oxalate with the ammonia. Organic substances such as herein described together with certain inorganic substances such as litharge, used in conjunction with alkaline materials in water solution as herein described, yield an effect such as has been described in scientific literature as due to the presence of polarized molecules.

The water which is required to provide the necessary fluidity is less than 15% of the total mix. Thus the action of these clay altering materials as used in our mix serves to greatly decrease the water content of the clay body as well as its drying shrinkage.

The reduction in water content and hence in shrinkage accomplished by means of these particular deflocculating and clay altering substances is such a great aid to the process that it has brought what was hitherto practically impossible into the range of the readily attainable.

The use of these reagents in this way has the further advantage that it puts the clay body in such physical condition that it is much more readily freed of air by means of the vacuum treatment than are clay bodies that are not so treated and put into this physical condition.

Casting slips as heretofore made are usually of approximately the consistency of "whipping cream." Whereas we use only sufficient water in the mix so that the resulting mixture, (paste) will just flow readily enough to fill the large dimension molds used in our process. With molds whose least dimension is twelve inches, this permits the use of a rather stiff paste. Maintaining low water content in this manner further aids toward low drying shrinkage. Under certain conditions it is possible to use slip that is somewhat thinner than above described. In forming blocks or other clay articles, it has heretofore been a matter of difficulty to cause all portions of the article to dry at the same rate: the top of the clay, being exposed freely to the air, normally dries out more quickly than the lower portion. Most of the moisture which leaves the block through the porous walls is evaporated into the air from them, the proportion retained in the walls at any one time depending on the nature of the porous material used. In the case of the relatively thin walls which we use this evaporation from the outer surface of the porous walls, which of course proceeds at approximately the same rate from all parts of the mold, tends to cause all parts of material that is in contact with the walls to dry at a uniform rate. The outer portion of this mass which is in contact with the porous walls, dries first and to avoid cracking in the center resulting from the shrinkage of the interior portion of the mass, we keep the exposed upper side of the mass in moist condition. For this purpose we employ a wet blanket of cloth or sand, or a water impervious medium such as paraffin, applied while fluid. We find that a medium such as paraffin gives the best results. We find further that if paraffin is made absolutely continuous over one surface of the block and is sealed air-tight against the mold sides, the block is forced to dry in such manner that the sides of the block are substantially straight without warping, while warping occurs if during the drying of the block the paraffin pulls away from the mold, thus permitting circulation of air between the block and the mold sides at the top. Thus, by covering the exposed portions of the blocks with fluid paraffin as soon as the molds containing the slip have been vibrated we are able to greatly lessen the ill effects of unequal drying between exposed and unexposed portions of the blocks. Although plastic clay shapes have been covered with cloths heretofore to retard drying, we believe that covering exposed portions of cast wares as herein described is unique. By the simultaneous use of all the above described steps our drying drying difficulties have been reduced from practically insurmountable to a state in which they are a very minor consideration, so that the dry blocks are practically free from drying defects. This part of our process yields the further advantage, that lack of drying troubles permits us to successfully manufacture by the casting process tank blocks of practically any desired size.

This lack of drying defects, greatly decreases the loss that becomes apparent on firing. The high dry weight per unit of volume decreases the firing shrinkage, which in turn decreases the probability of loss during firing.

3. *Firing.*—The calcined clay at present used as grog in the manufacture of tank blocks ranges in porosity from about eighteen to thirty-two percent. By the use of grog that is appreciably lower in porosity than this lower figure we are enabled to further decrease the firing shrinkage and thus also the probability of loss during firing.

Other dense refractory materials of equally low porosity such as $3Al_2O_3 2SiO_2$ (mullite, formerly thought to be sillimanite $Al_2O_3 SiO_2$), $Al_2O_3$ (corundum or fused alumina, etc.), cyanite and andalusite, etc., properly graded as to size, can in some cases be used in a manner similar to that described above for dense fired clay grog.

In cases where extreme refractoriness is not essential, we have found that "vitrified" white ware bisque (under 5% porosity) makes a very desirable grog of low porosity and consequent low shrinkage. In such cases vitrified bisque ground fine may be used as fines of the grog. Material of this character is obtainable in quantity from the manufactures of sanitary ware, electrical porcelain, etc.

This bisque contains flux material which assists and accelerates the development of mullite crystals in the mix. Other flux materials would act in the same way and can be used for the same purpose. Preferably we employ added flux in a quantity not in excess of 2% of the total mix, since an excessive quantity of flux material will render the body too non-refractory.

Most tank blocks as manufactured to-day contain innumerable fine (hair like) cracks throughout, particularly around the larger grog particles, many of which cracks become apparent only through firing of the ware and some of them only by the use of a hand magnifying glass. By the use as the fines of the grog, material that will not shrink on being fired as a constituent of blocks, we are enabled to largely overcome these hair cracks. By using as a constituent of blocks fines including an optimum proportion of material that will expand on being fired, we are enabled to practically eliminate this hair cracking, and obtain in the fired condition, a structure that is substantially continuous.

The reason for this behavior is that if the individual particle of the fines is so small that in shrinking around the particle, the plastic clay is not strained beyond its elastic limit, no cracks will appear. A good example is found in the case of certain siliceous clays. If Gross Almerode, or other clays containing sufficiently finely divided silica is used in a mix, fine silica (substantially fine grog) is automatically added to the mix. Such clays used in optimum proportions largely aid in obtaining continuousness of the fired mix.

By the use of grog that is substantially non-shrinking, in conjunction with the optimum proportion of expanding fines, we are able to produce a body (mix) that has practically zero burning shrinkage.

The mineral cyanite, when finely divided and used as fines in a body serves as expanding fines, aids in continuousness of fired wares containing it, and also in decreasing their firing shrinkage. For these reasons its use is particularly advantageous in the manufacture of large ware such as flux blocks.

We decrease the firing shrinkage as much as possible by the methods noted above for obtaining minimum dry porosity and maximum weight per unit volume and we find that this low firing shrinkage, in conjunction with the use of non-shrinking or "expanding fines" as last noted above, largely overcomes the difficulty of cracks opening up in service in tank block surfaces which receive the full temperature of the glass melting tank.

*4. Increased resistance to glass.*—As above noted certain clays of the ball clay type serve our purpose especially well. In addition to the advantageous properties noted above, these clays burn dense at low temperatures. So that with the present day heat treatments to which tank blocks are fired, of say from cone ten (Seger Orton pyrometric) to cone twelve, this clay becomes so dense that it practically does not shrink further when exposed to the maximum temperature of the glass tank during service. Thus by the use of such clays in conjunction with the features last above mentioned we are able to practically eliminate the cracking of tank block surfaces which are exposed to the full heat of the furnace.

As noted above, resistance of tank blocks to glass attack is increased by absence of cracks in surfaces exposed to glass action, absence of mechanical defects, and low porosity of the completed block. At a given porosity of product the more refractory a tank block is the better will it resist glass attack. The clays of the ball clay type that we find especially satisfactory have the further desirable feature that they are among the most refractory clays known and as such raise the refractoriness of tank blocks in which they are used.

In the formation of mullite from clay there is always an excess of silica. These clays which we use are especially high in alumina, hence with sufficient heat treatment they yield a product containing a larger proportion of mullite than do most clays. We have thus far spoken of these clays of the ball clay type only in connection with the plastic part of the mix, however on account of their dense burning properties they can be readily calcined by present day commercial heat treatments and make a grog that is much superior to the grogs in common use. Thus we are enabled to make tank blocks consisting entirely of these especially refractory ball clays.

As clay products are fired for long periods the crystalline material mullite, $3Al_2O_3 2SiO_2$ (formerly thought to be sillimanite, $$Al_2O_3 SiO_2)$$

gradually forms interlocking crystals throughout the mass. This interlocking structure is an advantage in tank blocks in that it binds the mass more firmly together and tends to prevent the escape of small portions of the blocks into the glass. In addition to this mullite is very resistant to glass action.

We have discovered that the mineral cyanite, finely ground, is a very desirable constituent in tank blocks, for on being fired, as a constituent of the tank block, it expands and is transformed to mullite and silica glass. Mullite is formed from cyanite by the use of a lesser heat treatment than from the other mullite yielding minerals known to us. In fact the commercial tank block firing temperature of cone twelve is sufficient to cause the cyanite present in tank block mixes to be started to be transformed into mullite. In addition to the above, mullite crystals during formation from cyanite grow out into the surrounding block tending to form an interlocking structure with other "cyanite-mullite" centers, whereas the mullite formed from other mullite forming minerals tends to assume the same crystalline form as the original minerals without branching out into surrounding material. Cyanite or rather its transformation products (mullite plus silica glass) is even more refractory than the special clays of the ball clay type that we use.

Densely burned bodies of the character that we use and which have a well developed mullite structure through them are more resistant to sudden heating and cooling than are correspondingly dense bodies that are not bound together by such a structure. Thus cyanite used in tank blocks serves first, as expanding fines, second, as the only means we know whereby interlocking mullite crystals in quantity can be developed in tank blocks by use of present day commercial heat treatment, without the use of fluxes to such an extent that they unduly decrease the refractoriness of the block. Third, to increase resistance to sudden heating and cooling and fourth to increase the refractoriness of the tank blocks even though the balance of the material be the extremely refractory ball clays described above.

Summary.

Blocks made as described above on being fired can be reduced to a given commercially desirable porosity with a lesser heat treatment than can the average commercial blocks made today.

Heretofore several of the steps that we employ have been used on a small scale in an effort to cast tank blocks, however the blocks produced have been so defective and so expensive to manufacture that they have never come into commercial use.

In previous attempts to cast tank blocks the drying shrinkage with attendant cracking of the ware and the subsequent firing shrinkage which makes the cracks more apparent have been so destructive that practically no merchantable ware has been obtained. By the means previously used it has been practically impossible to cast satisfactory wares more than five inches thick, whereas most tank blocks are at least twelve inches thick. In addition to this the costs of molds per finished block have been so high that this factor alone has been sufficient to keep the casting of tank blocks from becoming a commercial process. On the other hand it is because of the particular manner in which the various steps are carried out, the specific and unique materials that we use and the unusual percentages in which we use them, that we are able to keep molding, drying and firing losses within commercial limits. This in conjunction with cutting of the mold costs per block as described above makes our process commercially feasible.

By the use of certain grogs that are at present commercially available and that have relatively low porosities, we are able to cast blocks that are substantially free from the mechanical defects of hand, rammer and extrusion made tank blocks, and which hence give better service than do ordinary present day commercial blocks. In addition we are able to cast almost any sized tank block that may be desired.

By the use of the specially refractory ball clay grog or cyanite grog or both, we are able to still further increase the service of blocks containing them. Tank blocks made by the above described process have recently been tried experimentally in glass tanks and bear out the above statements.

Thus by the use of the above described several method steps and these several ingredients in this combination, which combination we believe is unique, we are enabled to produce tank blocks that are decidedly superior to tank blocks made by the present day processes. In other words, we are enabled to make a real advance in the art, and to commercially manufacture a product that is of great value in the glass industry.

We claim as our invention:

1. The method of making ceramic articles, which comprises providing grog grains of assorted sizes, providing deflocculatable raw clay in quantity sufficient to bond the grog particles, providing a deflocculating agent, mixing water or other liquid with the above-named materials, in quantity sufficient to form a paste, mixing the paste in a vacuum, and molding the paste so formed.

2. The method of making refractory articles, which comprises providing grog grains of assorted sizes, providing deflocculatable raw clay in quantity sufficient to bond the grog particles, providing ammonia, mixing liquid with the above-named materials, in quantity sufficient to form a paste, in an ammonia-tight system under vacuum and molding the paste so formed.

3. The method of making ceramic articles, which comprises providing grog grains of assorted sizes, providing deflocculatable raw clay in quantity sufficient to bond the grog particles, providing a deflocculating agent, mixing liquid with the above-named materials, in quantity sufficient to form a paste, providing a porous walled mold with removable sides, introducing the paste into the mold, vibrating the mold before the paste has consolidated, and removing the sides of the mold before the article is completely dried.

4. The method of making refractories, which comprises providing grog grains so assorted in size as to provide substantially minimum interstitial space, at least part of the grog being substantially non-shrinking in firing and use, and at least part of the fines of the grog being of such a nature that they expand on being fired, providing deflocculatable dense burning refractory raw clay, providing a deflocculating agent, providing ammonia, mixing liquid with the above-named materials in an ammonia tight system to form a paste containing less than 15% of water, and molding the paste so formed.

5. The method of casting ceramic articles which comprises providing grog grains, providing deflocculatable clay in sufficient quantity to bond the grog grains, providing a deflocculating agent, mixing water with said materials to form a paste, introducing said paste into a porous mold, and removing the sides of the mold when the article formed by said paste has become sufficiently consolidated to be self-sustaining.

6. The method of casting refractory articles which comprises providing grog grains, providing deflocculatable clay in sufficient quantity to bond the grog grains, providing a deflocculating agent, mixing water with said materials to form a paste, introducing said paste into a mold, covering a portion of the material to retard drying of certain parts thereof, and removing the sides of the mold when the article formed by said paste has become sufficiently consolidated to be self-sustaining.

7. The method of casting refractory articles which comprises providing grog grains and deflocculatable clay in sufficient quantity to bond the grog grains, providing a deflocculating agent, mixing water with said materials to form a paste, subjecting the paste to vacuum while in motion, introducing said paste into a porous mold, vibrating the mold before the paste has set, and removing the sides of the mold when the article formed by said paste has become sufficiently consolidated to be self-sustaining.

8. The method of making refractories, which comprises providing grog grains so assorted in size as to provide substantially minimum interstitial space, and at least part of the fines of the grog being of such a nature that they expand on being fired, providing deflocculatable dense burning raw clay, having a mineral that will yield mullite under unusually mild heat treatments, providing a deflocculating agent, providing ammonia, mixing liquid with the above-named materials in an ammonia tight system to form a paste containing less than 15% of water, and molding the paste so formed.

9. The method of making refractory articles, which comprises providing grog grains of assorted sizes at least part of the fines of the grog being the mineral cyanite, providing a deflocculating agent, mixing liquid with the above named materials in quantity sufficient to form a paste, and molding the paste so formed, the cyanite serving as expanding fines to compensate for shrinkage of the clay upon firing.

10. The method of making refractory articles, which comprises providing grog grains of assorted sizes and having non-shrinking fines such that approximately 33% by weight will pass a 100 mesh (U. S. B. Stds.) sieve, assorted in size from minus 100 to extreme fines, providing deflocculatable raw clay in quantity sufficient to bond the grog particles, providing a deflocculating agent, mixing liquid with the above-named materials in quantity sufficient to form a paste, molding the paste so formed, and firing the molded mixture, the non-shrinking fines serving to reduce the tendency of the article to shrink under firing.

11. The method of making refractory articles, which comprises providing grog grains of assorted sizes, providing deflocculatable raw clay in quantity sufficient to bond the grog particles, providing a deflocculating agent of a composition containing one or more alkali compounds that will yield hydroxyl radical in water solution, to organic matter such as that which naturally occurs in clay, together with another organic substance consisting of a highly oxygenated polyhydroxyl compound, and ammonia, mixing liquid with the above named materials in quantity sufficient to form a paste, and molding the paste so formed.

12. The method of making refractory articles, which comprises providing grog grains of assorted sizes, providing deflocculatable raw clay in quantity sufficient to bond the grog particles, providing a deflocculating agent containing ammonia, introducing oxalic acid, or an oxalate, mixing the liquid with said materials to form a paste, and molding the paste so formed.

13. The method of making refractories, which comprises providing grog grains so assorted in size as to provide substantially minimum interstitial space, at least part of the grog being substantially non-shrinking in firing and use, providing deflocculatable dense burning extremely raw clay, providing a deflocculating agent, providing ammonia, mixing liquid with the above-named materials in an ammonia tight chamber system to form a paste containing less than 15% of water, and molding the paste so formed.

14. The method of making ceramic articles, which comprises providing grog grains of assorted sizes, providing raw clay in sufficient quantity to bond the grog particles, adding a flux which will assist mullite development under a relatively low heat treatment, mixing liquid with said materials in quantity sufficient to form a paste, and molding the paste so formed.

15. The method of making ceramic articles, which comprises providing grog grains of assorted sizes, at least part of the fines of the grog being vitrified bisque, providing deflocculatable raw clay in quantity sufficient to bond the grog particles, providing a deflocculating agent, mixing liquid with the above-named materials, in quantity sufficient to form a paste, and molding the paste so formed, the fines of vitrified bisque being non-shrinking.

16. The method of making ceramic articles, which comprises mixing grog having expanding fines with a bonding clay and a liquid, molding the mixture to an article of the desired form, and drying and firing the article to a point where the fines are expanded to compensate to a degree for the firing shrinkage of the clay.

17. The method of making ceramic articles, which comprises mixing grog with clay in quantity sufficient to bond the grog particles, mixing liquid with the above-named materials, in quantity sufficient to form a paste, molding the paste so formed, and drying and firing the article, the grog containing substantially non-shrinking fines so graded that the clay matrix completely fills the interstices between them when firing has been completed.

18. The method of making ceramic articles, which comprises providing grog grains, providing deflocculatable raw clay in quantity sufficient to bond the grog particles, providing a deflocculating agent, mixing water or other liquid with the above-named materials in a vacuum to form a paste, and molding the paste so formed.

19. The method of making ceramic articles, which comprises providing grog grains, providing raw clay in sufficient quantity to bond the grog particles, adding a flux capable of developing mullite under a relatively low heat treatment, mixing liquid with said materials in quantity sufficient to form a paste, and molding the paste so formed.

20. The method of making ceramic articles, which comprises mixing grog grains with a bonding clay and a liquid to form a paste, introducing the paste into an open-top porous mold, and covering the top of the paste with a fluid that will harden and form a coating impervious to water.

21. The method of making ceramic articles, which comprises mixing grog grains with a bonding clay and a liquid to form a paste, introducing the paste into an open-top mold, and covering the top of the paste with a fluid that will harden and form a coating impervious to water.

22. The method of producing a ceramic paste, which comprises employing a grog of low porosity, proportioning the grog particles to each other so as to form interstitial space of approximately eighteen per cent of the grog volume, adding deflocculatable clay thereto in volume only sufficient to substantially fill said interstitial space, adding deflocculating agents and water in quantity sufficient only to produce a paste of the desired consistency, and mixing said ingredients into a homogeneous mass.

23. The method of casting refractory articles which comprises providing grog grains and deflocculatable clay in sufficient quantity to bond the grog grains, providing a deflocculating agent, mixing water with said materials under vacuum to form a paste, introducing the paste into a mold, vibrating the mold before the paste has set, and removing the sides of the mold when the article formed by said paste has become sufficiently consolidated to be self-sustaining.

24. The method of forming a ceramic article which comprises mixing ceramic materials with a deflocculating agent and a liquid, the ceramic materials being graded to provide maximum density, introducing the mixture into a mold, vibrating the mold, and drying and firing the article.

25. The method of forming a ceramic article which comprises mixing ceramic materials, some of which will crystallize on heating, with a liquid, the ceramic materials being graded to provide maximum density, introducing the mixture into a mold, vibrating the mold, drying the article, and firing the article to a point where a crystalline content is developed in the ceramic materials.

In testimony whereof we the said JAMES M. LAMBIE, and DONALD W. ROSS, have hereunto set our hands.

JAMES M. LAMBIE.
DONALD W. ROSS.